(12) United States Patent
Beyerl et al.

(10) Patent No.: US 11,322,792 B2
(45) Date of Patent: *May 3, 2022

(54) SUPPORT MEMBER FOR BATTERY PACK TOP HOUSING

(71) Applicant: MILWAUKEE ELECTRIC TOOL CORPORATION, Brookfield, WI (US)

(72) Inventors: Andrew T. Beyerl, Pewaukee, WI (US); Michael Kolden, Wauwatosa, WI (US); Troy C. Thorson, Cedarburg, WI (US); Jeffrey M. Wackwitz, Waukesha, WI (US); Jeffrey S. Holly, West Bend, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/539,670

(22) Filed: Dec. 1, 2021

(65) Prior Publication Data

US 2022/0094004 A1 Mar. 24, 2022

Related U.S. Application Data

(63) Continuation of application No. 17/185,067, filed on Feb. 25, 2021, which is a continuation of application No. 16/292,679, filed on Mar. 5, 2019, now Pat. No. 10,938,079, which is a continuation of application No. 16/106,836, filed on Aug. 21, 2018, now Pat. No. 10,249,854, which is a continuation of application No. 15/173,007, filed on Jun. 3, 2016.

(Continued)

(51) Int. Cl.
  *H01M 50/213* (2021.01)
  *H01M 50/20* (2021.01)
  *H01M 50/209* (2021.01)

(52) U.S. Cl.
  CPC ......... *H01M 50/213* (2021.01); *H01M 50/20* (2021.01); *H01M 50/209* (2021.01); *H01M 2220/30* (2013.01)

(58) Field of Classification Search
  None
  See application file for complete search history.

(56) References Cited

U.S. PATENT DOCUMENTS 6,566,005 B1 5/2003 Shimma et al.
6,692,864 B1 2/2004 Dansui et al.
(Continued)

OTHER PUBLICATIONS

Bellis, "History of Screws and Screwdrivers," <http://theinventors.org/library/inventors/blscrewdriver.htm>, 2006 (2 pages).

(Continued)

*Primary Examiner* — Haroon S. Sheikh
(74) *Attorney, Agent, or Firm* — Michael Best & Friedrich LLP

(57) ABSTRACT

A battery pack that is connectable to and supportable by a power tool (e.g., a hand-held power tool). The battery pack includes a top housing having a support member. The support member of the battery pack top housing is configured or operable to reinforce a support portion of the battery pack that is used to connect the battery pack to the power tool. By reinforcing the support portion of the battery pack, an interface between the battery pack and the power tool is able to withstand greater forces (e.g., from vibrations caused by the power tool).

20 Claims, 14 Drawing Sheets

Related U.S. Application Data

(60) Provisional application No. 62/171,731, filed on Jun. 5, 2015.

(56) References Cited

U.S. PATENT DOCUMENTS

| | | |
|---|---|---|
| 6,783,886 B1 | 8/2004 | Sakakibara et al. |
| 7,618,741 B2 | 11/2009 | Casalena et al. |
| 7,944,174 B2 | 5/2011 | Casalena et al. |
| 8,092,932 B2 | 1/2012 | Phillips et al. |
| 8,764,852 B2 | 7/2014 | Scott et al. |
| 2004/0106036 A1 | 6/2004 | Geis et al. |
| 2004/0202927 A1 | 10/2004 | Drea et al. |
| 2008/0113262 A1 | 5/2008 | Phillips et al. |
| 2008/0286641 A1 | 11/2008 | Yonishi |
| 2008/0302552 A1 | 12/2008 | Kondo |
| 2010/0221594 A1 | 9/2010 | Roßkamp et al. |
| 2010/0253279 A1 | 10/2010 | Mattias |
| 2012/0208078 A1 | 8/2012 | Koh |
| 2013/0106343 A1 | 5/2013 | Cruise et al. |
| 2013/0202926 A1 | 8/2013 | Koon |
| 2013/0330576 A1 | 12/2013 | Kolden et al. |
| 2014/0154535 A1 | 6/2014 | Olsson et al. |
| 2016/0020443 A1 | 1/2016 | White et al. |
| 2018/0040864 A1 | 2/2018 | Rejman et al. |

OTHER PUBLICATIONS

International Search Report and Written Opinion for Application No. PCT/US2016/035780 dated Sep. 19, 2016 (14 pages).
European Patent Office Search Report for Application No. 16804545.8 dated Nov. 29, 2018 (7 pages).
European Patent Office Examination Report for Application No. 16804545.8 dated Mar. 19, 2020 (6 pages).

SUPPORT MEMBER FOR BATTERY PACK TOP HOUSING

RELATED APPLICATIONS

This application is a continuation of U.S. patent application Ser. No. 17/185,067, filed Feb. 25, 2021, which is a continuation of U.S. patent application Ser. No. 16/292,679, filed Mar. 5, 2019, now U.S. Pat. No. 10,938,079, which is a continuation of U.S. patent application Ser. No. 16/106,836, filed Aug. 21, 2018, now U.S. Pat. No. 10,249,854, which is a continuation of U.S. patent application Ser. No. 15/173,007, filed Jun. 3, 2016, which claims the benefit of U.S. Provisional Patent Application No. 62/171,731, filed Jun. 5, 2015, the entire contents of all of which are hereby incorporated by reference.

BACKGROUND

This invention relates to a power tool battery pack.

SUMMARY

This invention provides a battery pack that is connectable to and supportable by a power tool (e.g., a hand-held power tool). The battery pack includes a top housing having a support member. The support member of the battery pack top housing is configured or operable to reinforce a support portion of the battery pack that is used to connect the battery pack to the power tool. By reinforcing the support portion of the battery pack, an interface between the battery pack and the power tool is able to withstand greater forces applied to the interface (e.g., from vibrations caused by the power tool, from the weight of the battery pack, etc.).

In one embodiment, the invention provides a battery pack that is connectable to and supportable by a power tool. The battery pack includes a housing. The housing includes a support portion operable to interface the battery pack with the power tool. The support portion includes a support member operable to reinforce the support portion. The support member is made of a different material than the housing.

In another embodiment, the invention provides a battery pack that is connectable to and supportable by a power tool. The battery pack includes a housing. The housing includes a top housing. The top housing includes a support portion operable to interface the battery pack with the power tool. The support portion includes a support member operable to reinforce the support portion. The support member is made of a metallic material.

In another embodiment, the invention provides a battery pack that is connectable to and supportable by a power tool. The battery pack includes a housing. The housing includes a support portion operable to interface the battery pack with the power tool. The support portion includes a support member operable to reinforce the support portion. The support member is made of a different material than the top housing and includes a first portion, a second portion, a third portion, a fourth portion, and a fifth portion. The first portion and the second portion are approximately perpendicular to the third portion and the fourth portion. The first portion is approximately parallel to the second portion, and the third portion is approximately parallel to the fourth portion. The fifth portion is approximately perpendicular to the first portion and the second portion and approximately parallel to the third portion and the fourth portion.

Before any embodiments of the invention are explained in detail, it is to be understood that the invention is not limited in its application to the details of the configuration and arrangement of components set forth in the following description or illustrated in the accompanying drawings. The invention is capable of other embodiments and of being practiced or of being carried out in various ways. Also, it is to be understood that the phraseology and terminology used herein are for the purpose of description and should not be regarded as limiting. The use of "including," "comprising," or "having" and variations thereof herein are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

In addition, it should be understood that embodiments of the invention may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (e.g., stored on non-transitory computer-readable medium) executable by one or more processing units, such as a microprocessor and/or application specific integrated circuits ("ASICs"). As such, it should be noted that a plurality of hardware and software based devices, as well as a plurality of different structural components may be utilized to implement the invention. For example, "servers" and "computing devices" described in the specification can include one or more processing units, one or more computer-readable medium modules, one or more input/output interfaces, and various connections (e.g., a system bus) connecting the components.

Other aspects of the invention will become apparent by consideration of the detailed description and accompanying drawings.

DETAILED DESCRIPTION

Embodiments of the invention described herein are related to a battery pack that includes a support member. The battery pack is connectable to and supportable by a power tool that includes a motor (e.g., brushless direct current ["BLDC"] motor). The hand-held power tool includes, for example, a housing, the motor, control electronics, one or more terminals for electrically connecting the battery pack to the control electronics, a trigger, and an output device or mechanism to be driven by the motor (see FIG. 15). The power tool can be, for example, a hammer drill/driver, a drill/driver, an impact driver, an impact wrench, etc.

Figure 1:
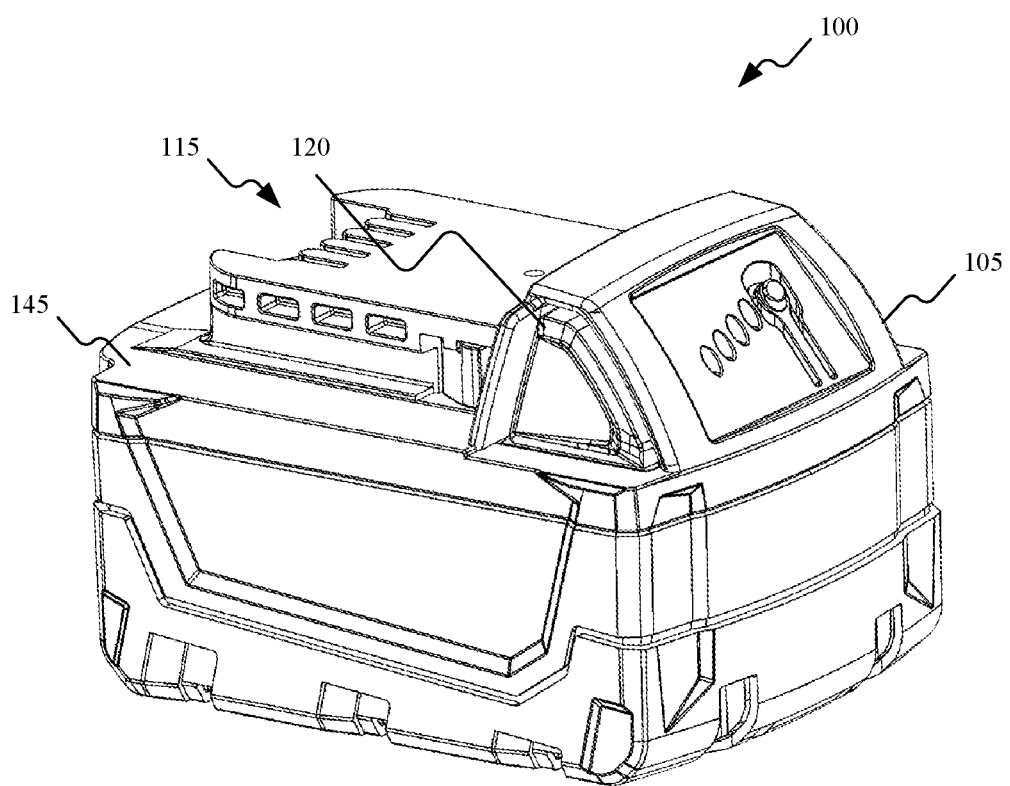
FIGS. 1-3 illustrate a battery pack for a power tool according to an embodiment of the invention.
Figure 2:
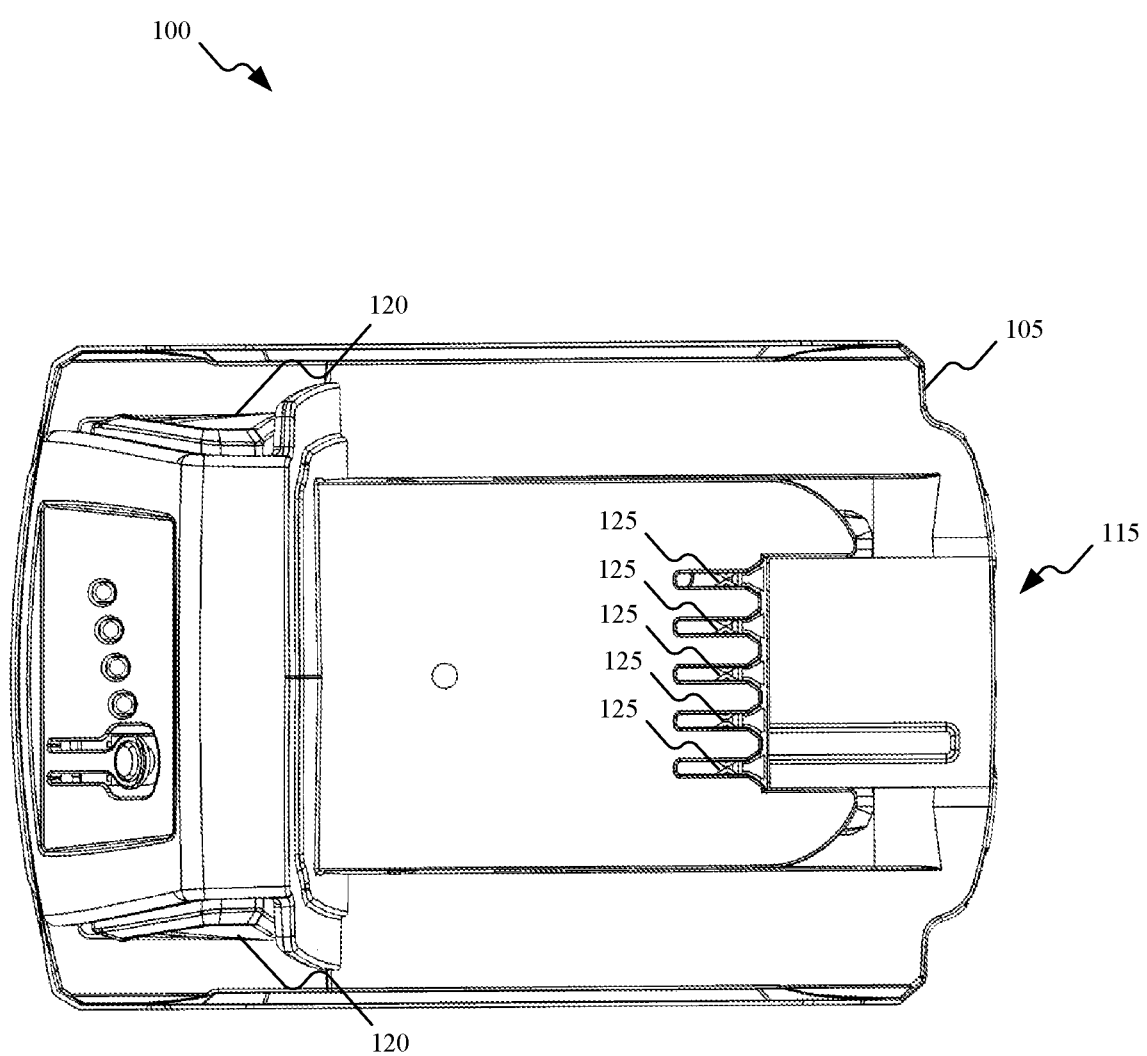
Figure 3:
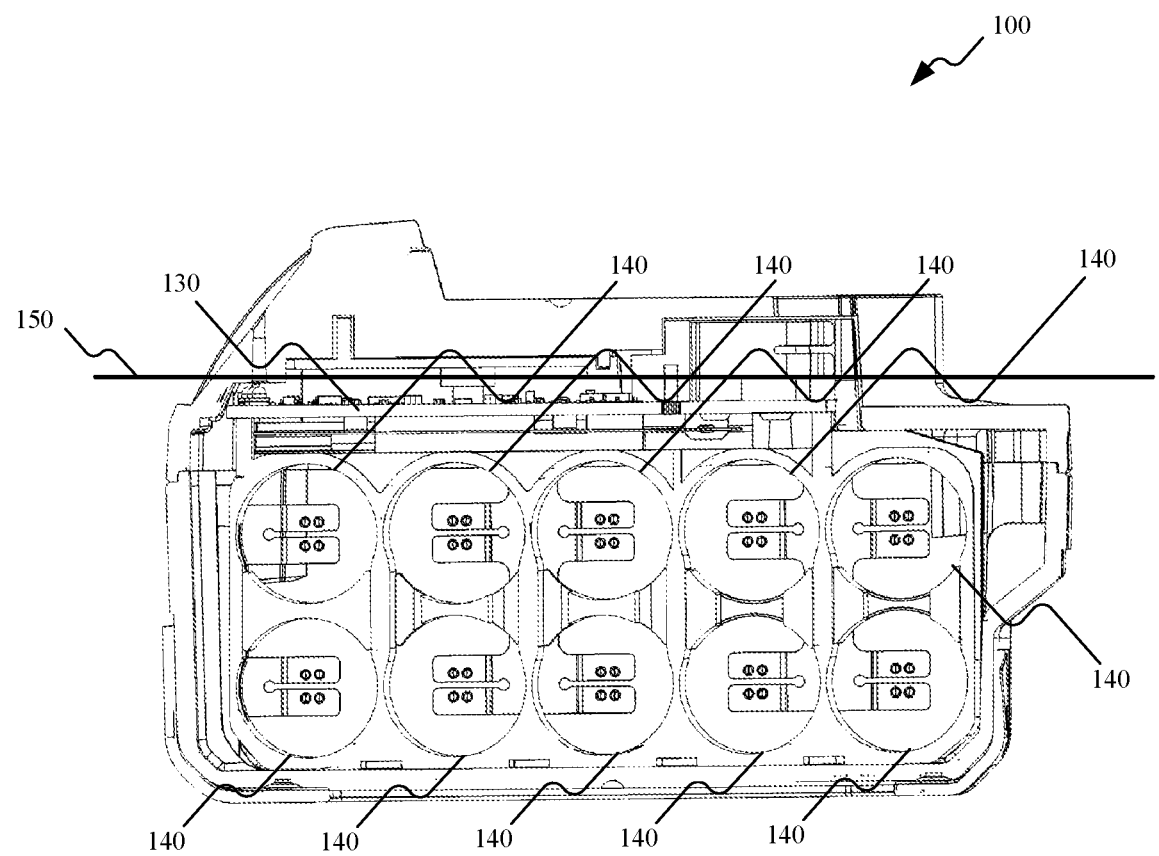

The motor for the power tool receives power (i.e., voltage and current) from the battery pack, such as the battery pack 100 illustrated in FIGS. 1-3. The battery pack 100 is connectable to and supportable by the power tool. As shown in FIGS. 1-3, the battery pack 100 includes a housing 105 and at least one rechargeable battery cell 110 supported by the housing 105. In some embodiments, the housing 105 is made of a hard plastic material. The battery pack 100 also includes a support portion 115 for supporting the battery pack 100 on and coupling the battery pack 100 to a power tool, and a coupling mechanism 120 for selectively coupling the battery pack to, or releasing the battery pack 100 from, the power tool. In the illustrated embodiment, the support portion 115 is connectable to a complementary support portion on the power tool (e.g., rails/grooves, etc.).

The battery pack 100 includes a plurality of terminals 125 within the support portion 115 and operable to electrically connect the battery cells 110 to a printed circuit board ("PCB") 130 within the battery pack 100. The plurality of terminals 125 includes, for example, a positive battery terminal, a ground terminal, and a sense terminal. The battery pack 100 is removably and interchangeably connected to a power tool to provide operational power to the power tool. The terminals 125 are configured to mate with corresponding power terminals extending from a power tool. The battery pack 100 substantially encloses and covers the terminals on the power tool when the pack 100 is positioned within the battery pack receiving portion. That is, the battery pack 100 functions as a cover for the opening and terminals of the power tool. Once the battery pack 100 is disconnected from the power tool, the terminals on the power tool are exposed to the surrounding environment.

In some embodiments, the battery pack 100 includes ten battery cells 110. In other embodiments, the battery pack 100 includes more or fewer battery cells 110. The battery cells 110 can be arranged in series, parallel, or a series-parallel combination. For example, the battery pack can include a total of ten battery cells 110 configured in a series-parallel arrangement of five sets of two parallel-connected cells. The series-parallel combination of battery cells 110 allows for an increased voltage and an increased capacity of the battery pack 100. In some embodiments, the battery pack 100 includes five series-connected battery cells 110. In other embodiments, the battery pack 100 includes a different number of battery cells (e.g., between three and twelve battery cells) connected in series, parallel, or a series-parallel combination in order to produce a battery pack having a desired combination of nominal battery pack voltage and capacity.

Figure 4:
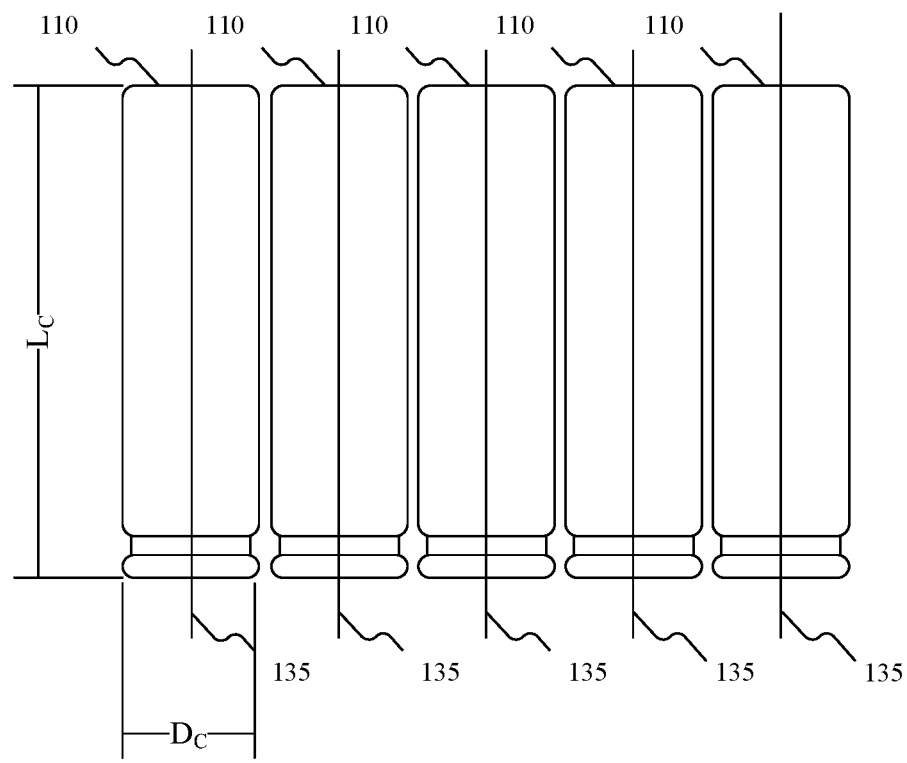
FIGS. 4-5 illustrate battery cells included in the battery pack of FIG. 1.
Figure 5:
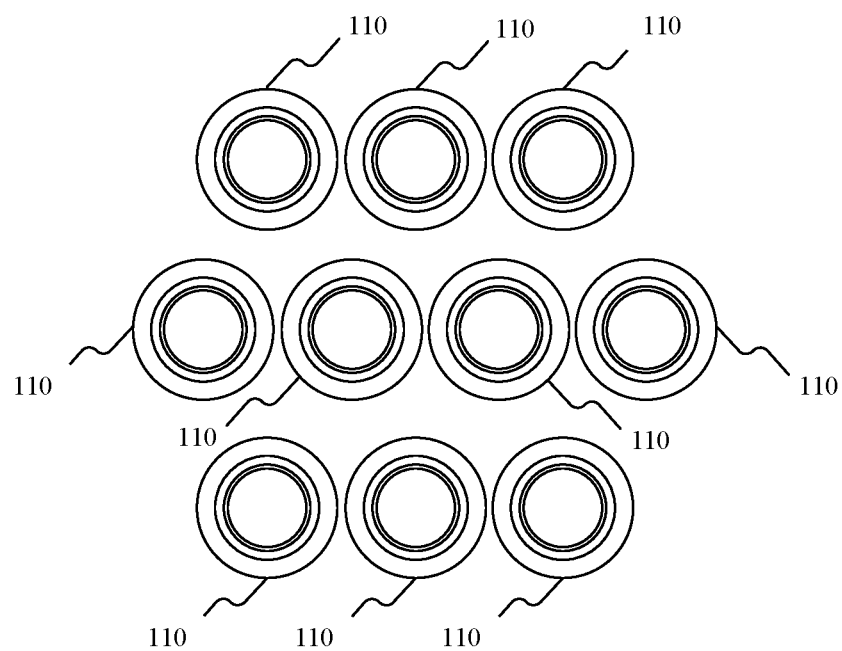
Figure 6:
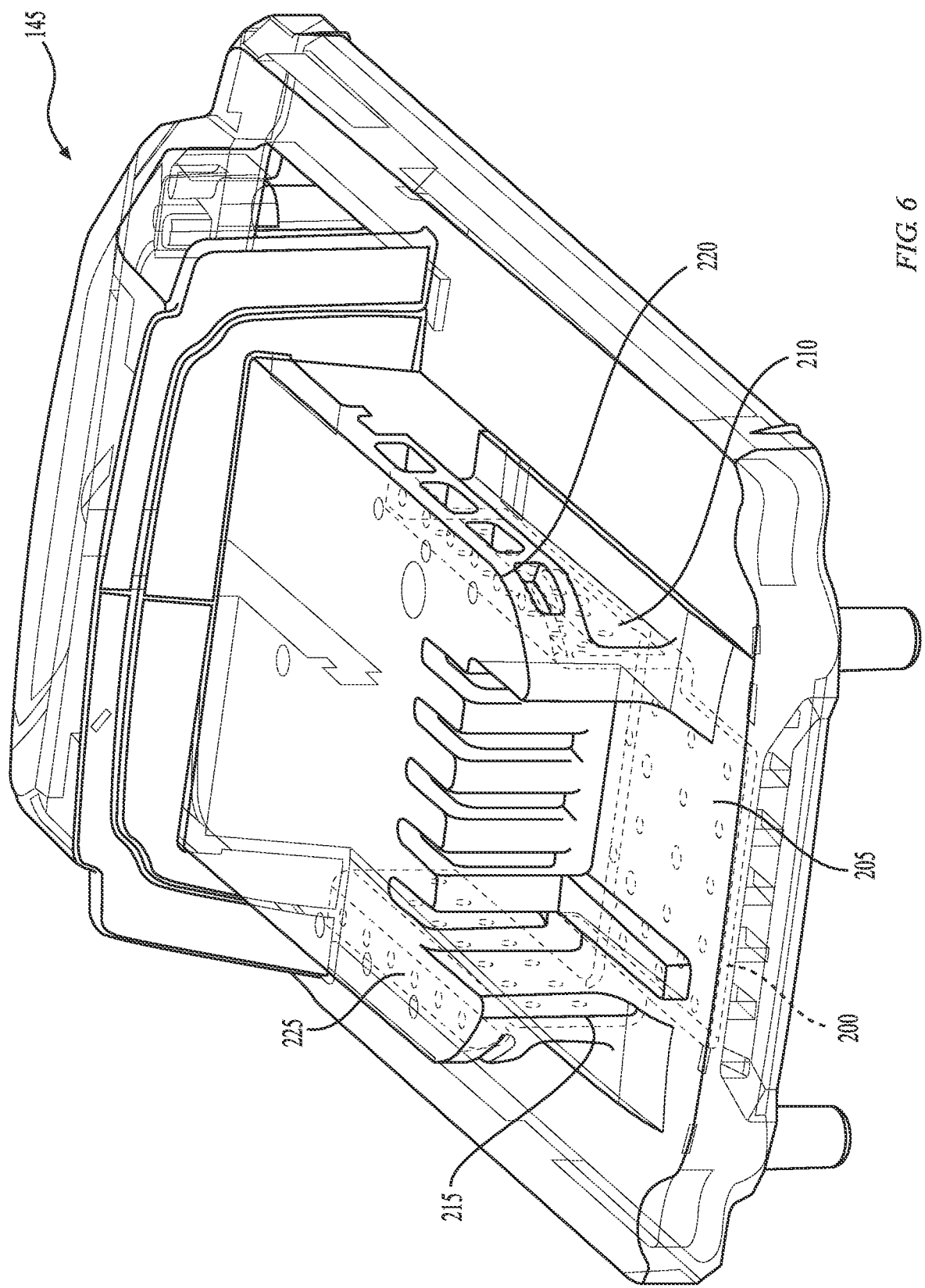
FIG. 6 is a rear perspective view of a top housing of the battery pack of FIG. 1 that includes a support member.
Figure 7:
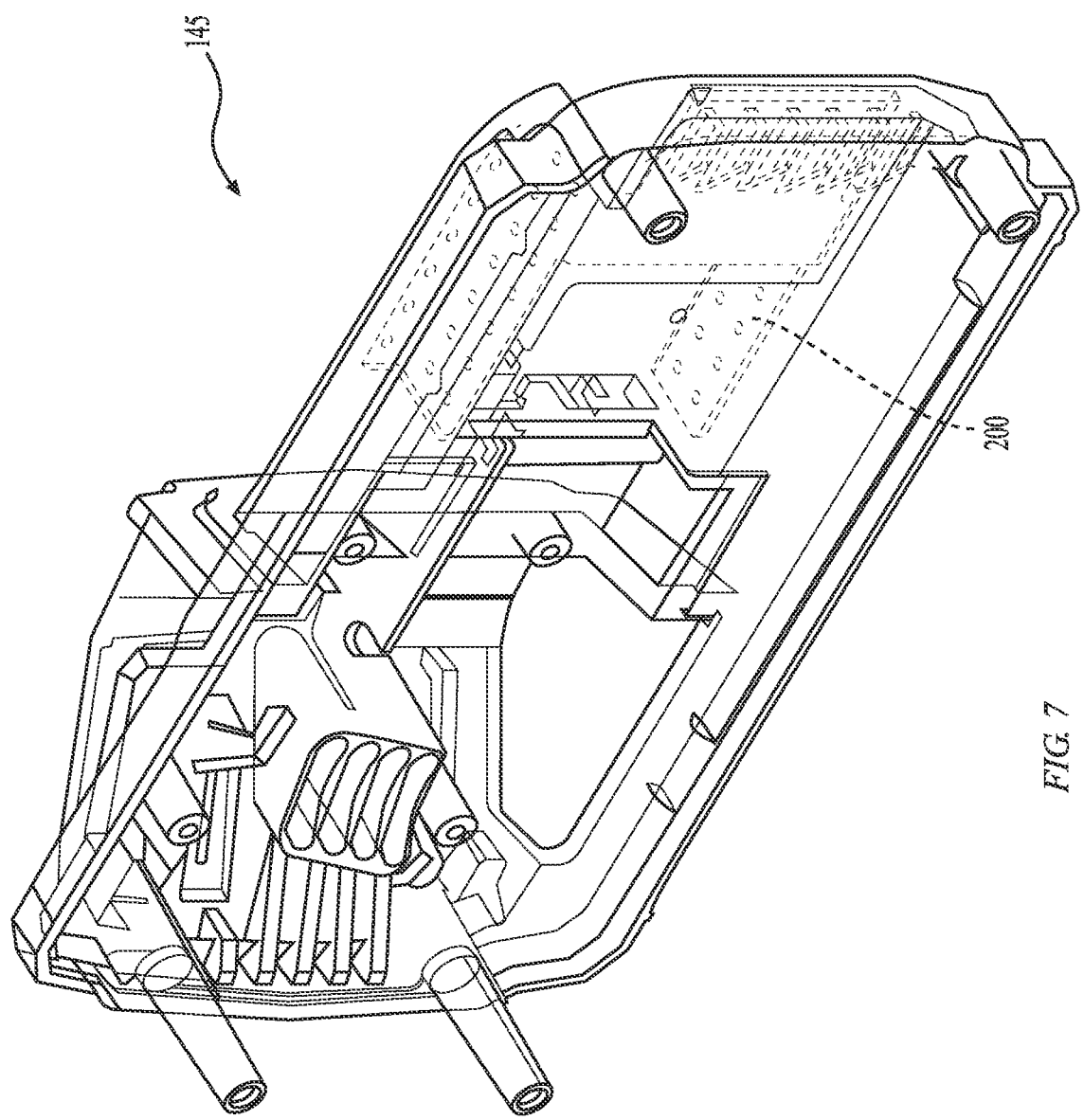
FIG. 7 is a bottom perspective view of the top housing of the battery pack of FIG. 1 that includes the support member.
Figure 8:
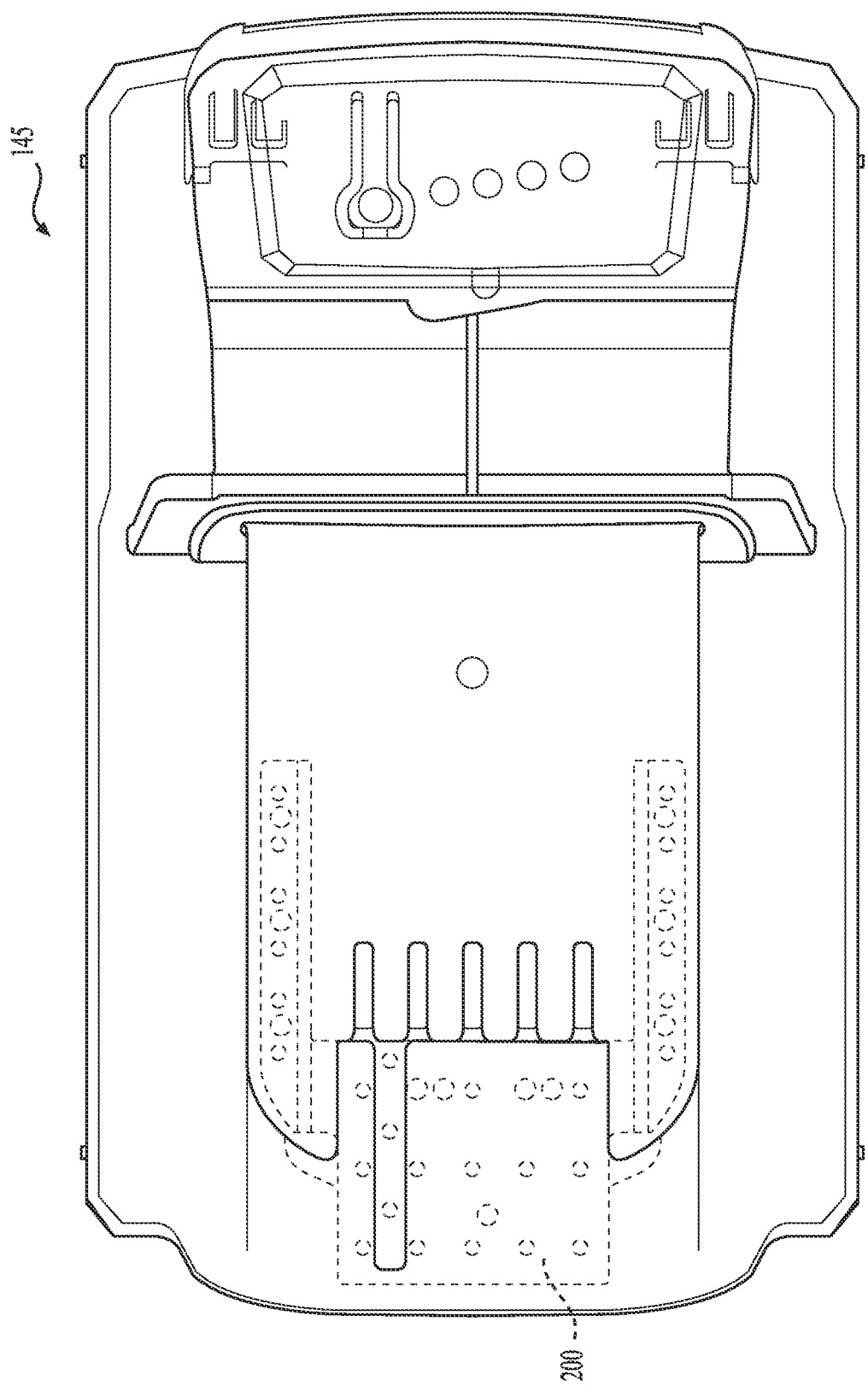
FIG. 8 is a top view of the top housing of the battery pack of FIG. 1 that includes the support member.
Figure 9:
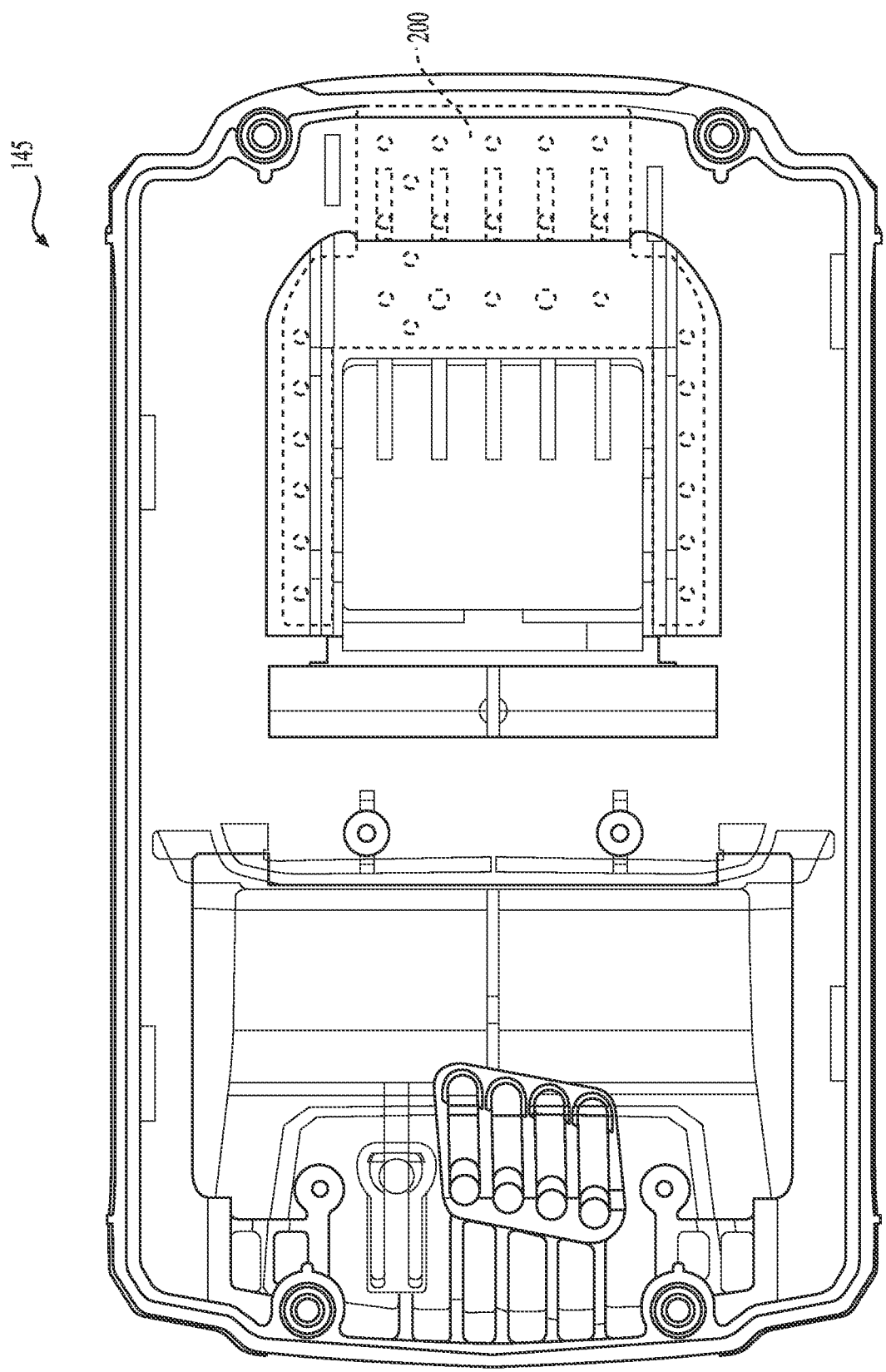
FIG. 9 is a bottom view of the top housing of the battery pack of FIG. 1 that includes the support member.
Figure 10:
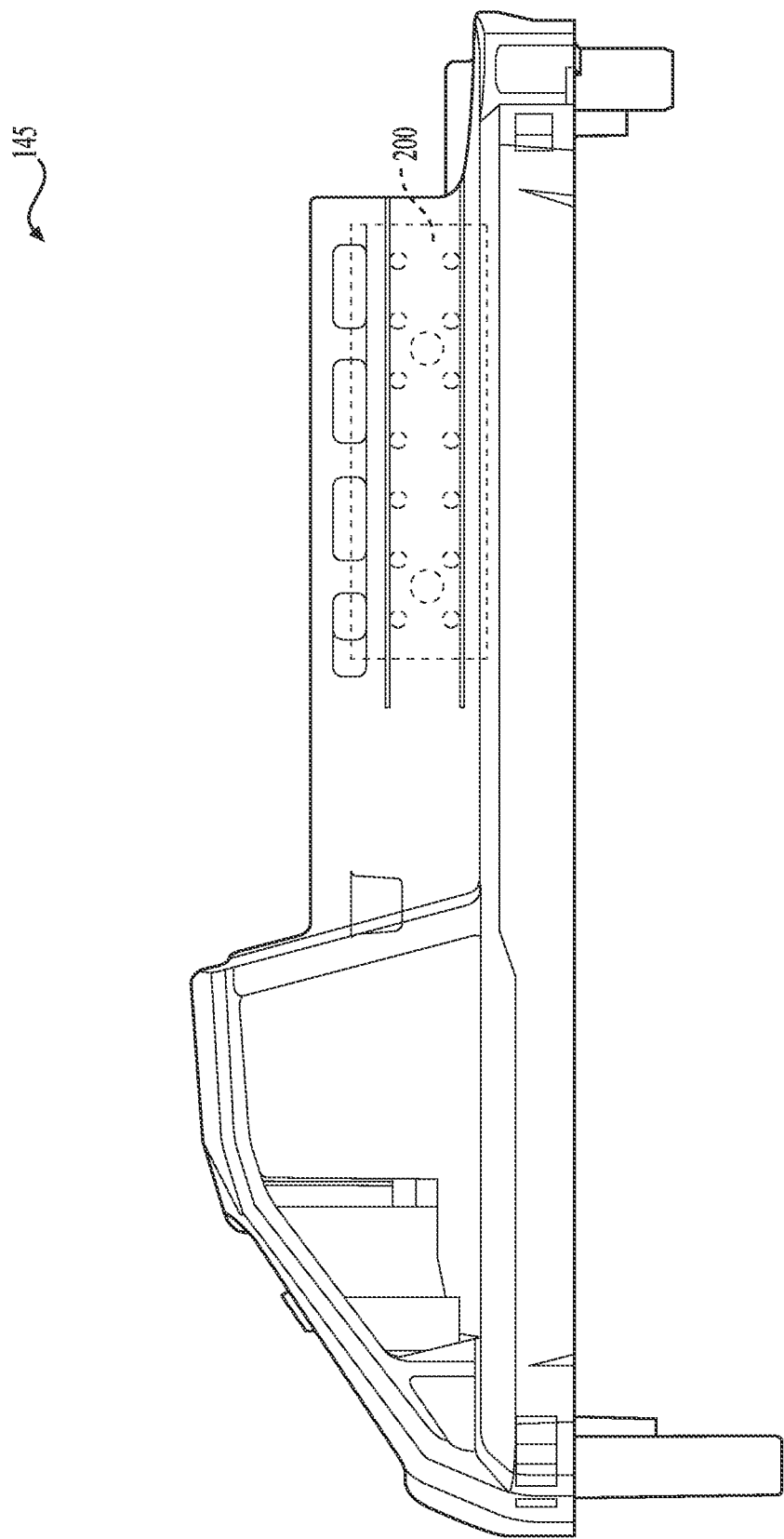
FIG. 10 is a right-side view of the top housing of the battery pack of FIG. 1 that includes the support member.
Figure 11:
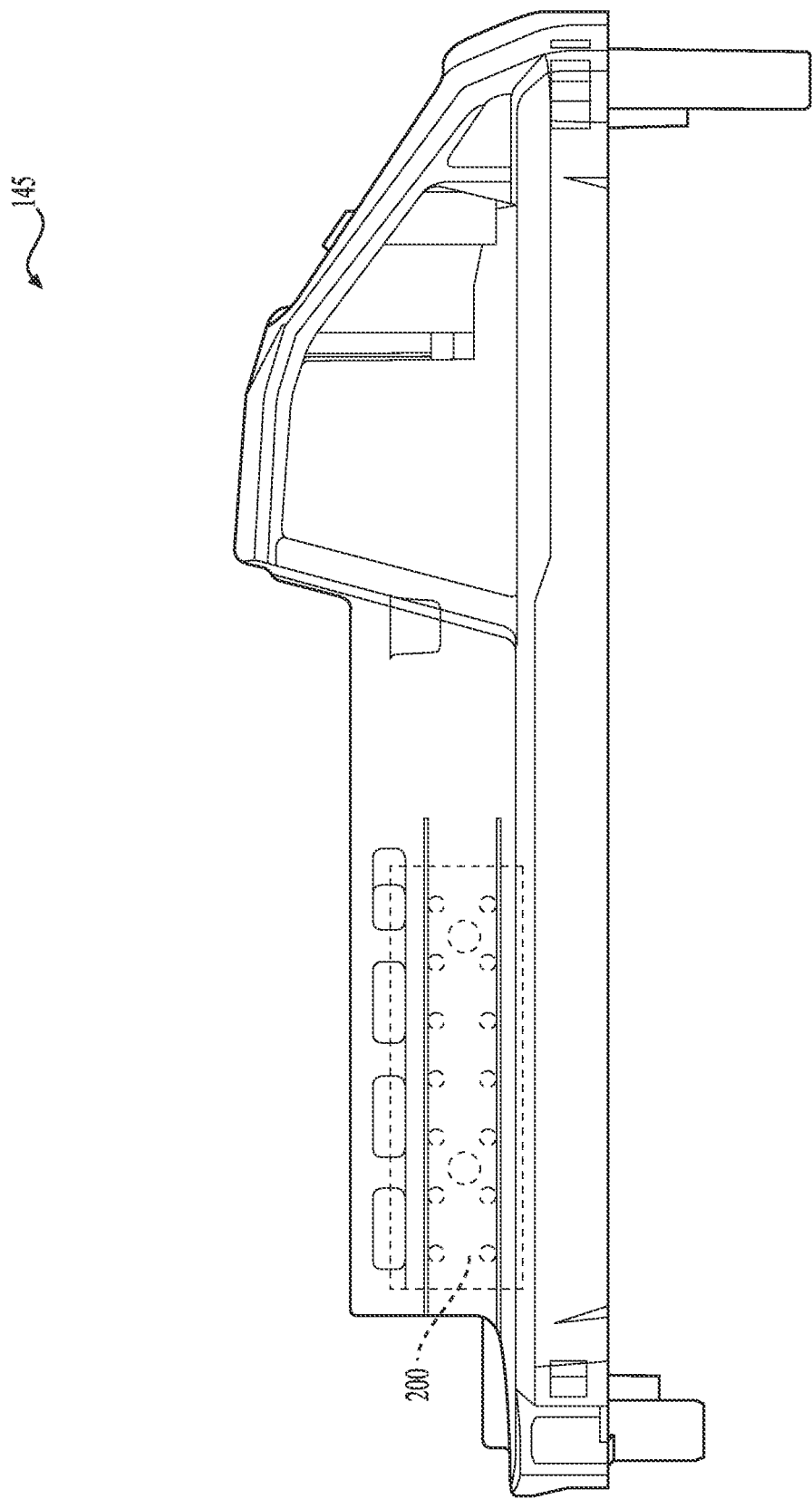
FIG. 11 is a left-side view of the top housing of the battery pack of FIG. 1 that includes the support member.
Figure 12:
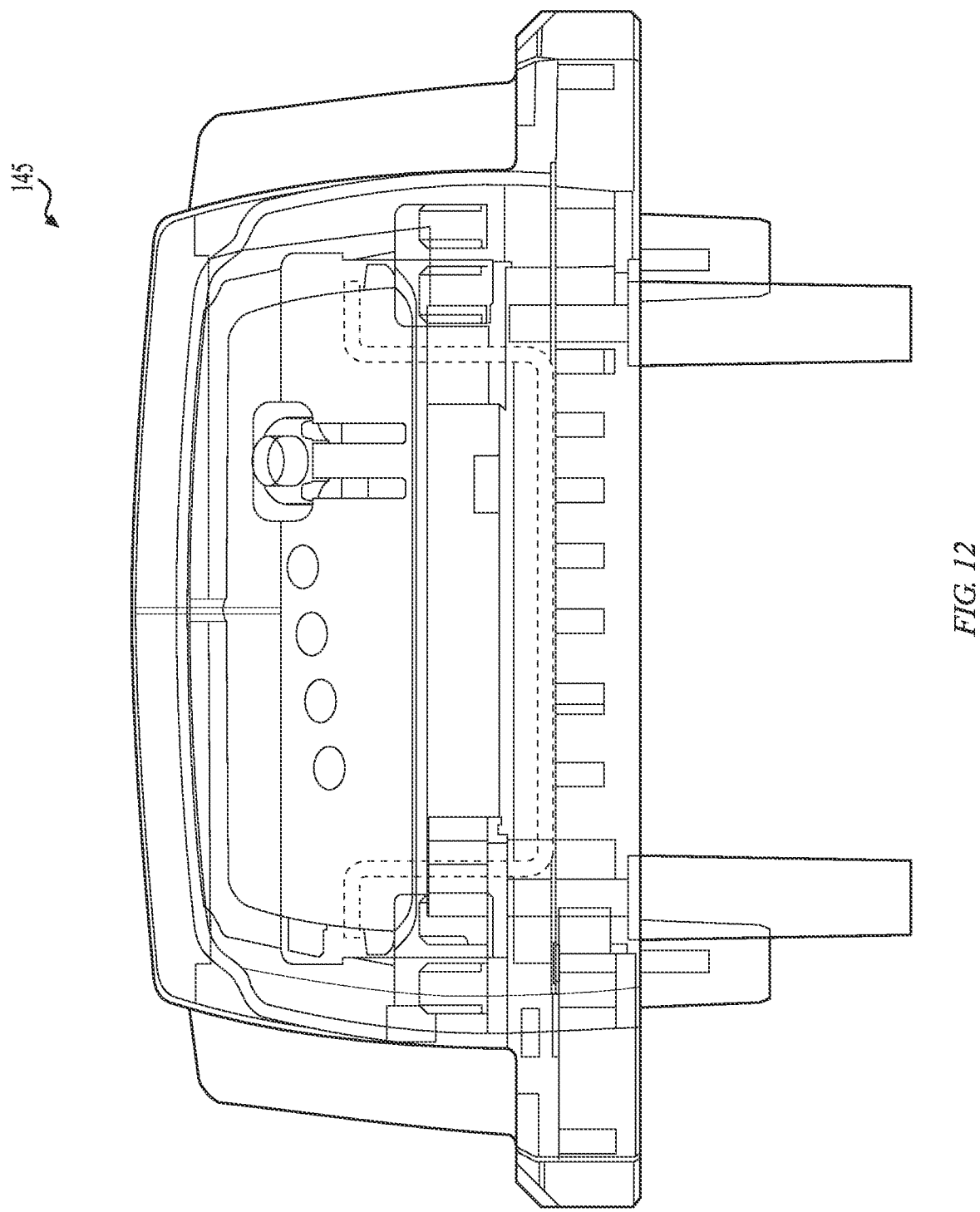
FIG. 12 is a front view of the top housing of the battery pack of FIG. 1 that includes the support member.
Figure 13:
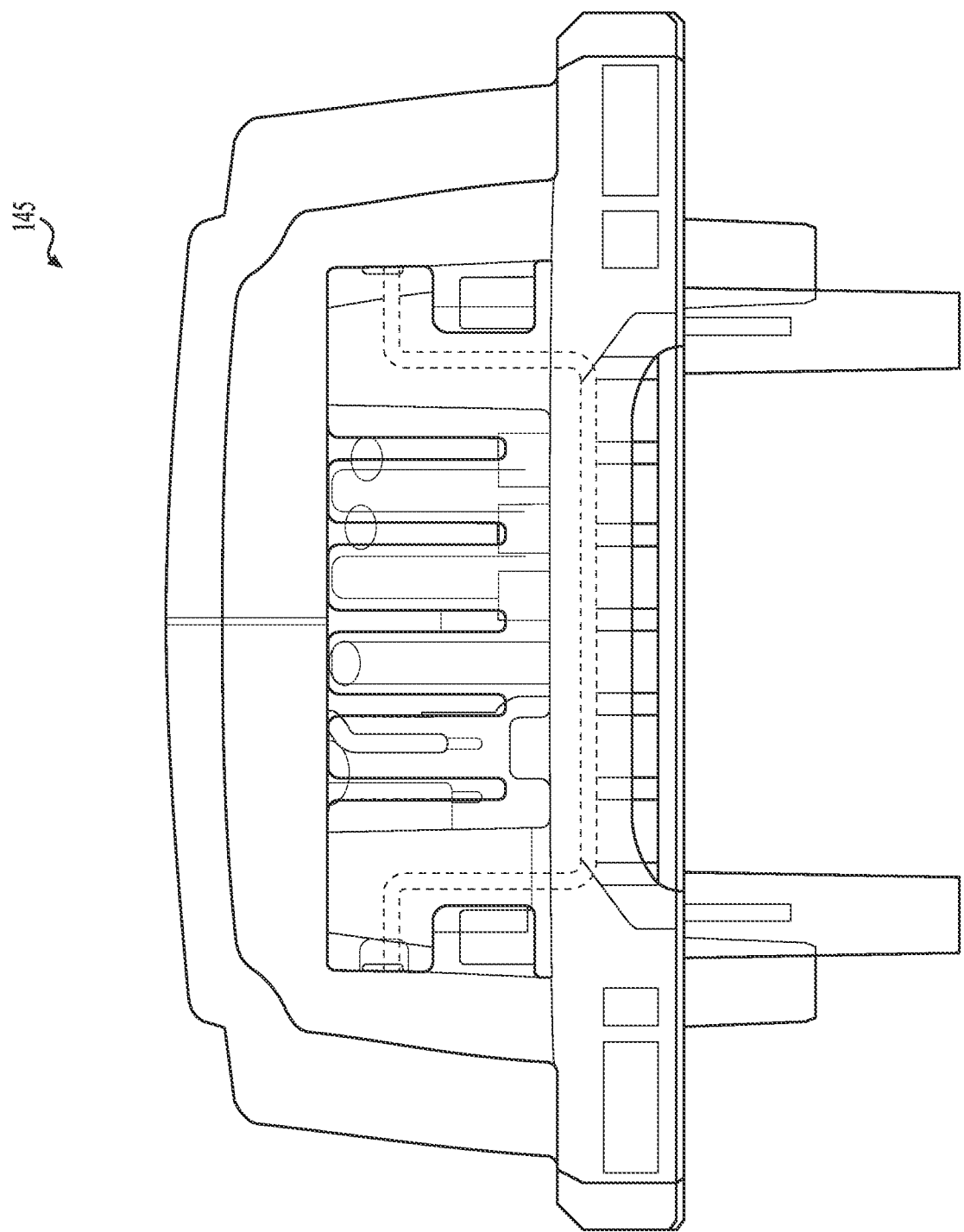
FIG. 13 is a rear view of the top housing of the battery pack of FIG. 1 that includes the support member.
Figure 14:
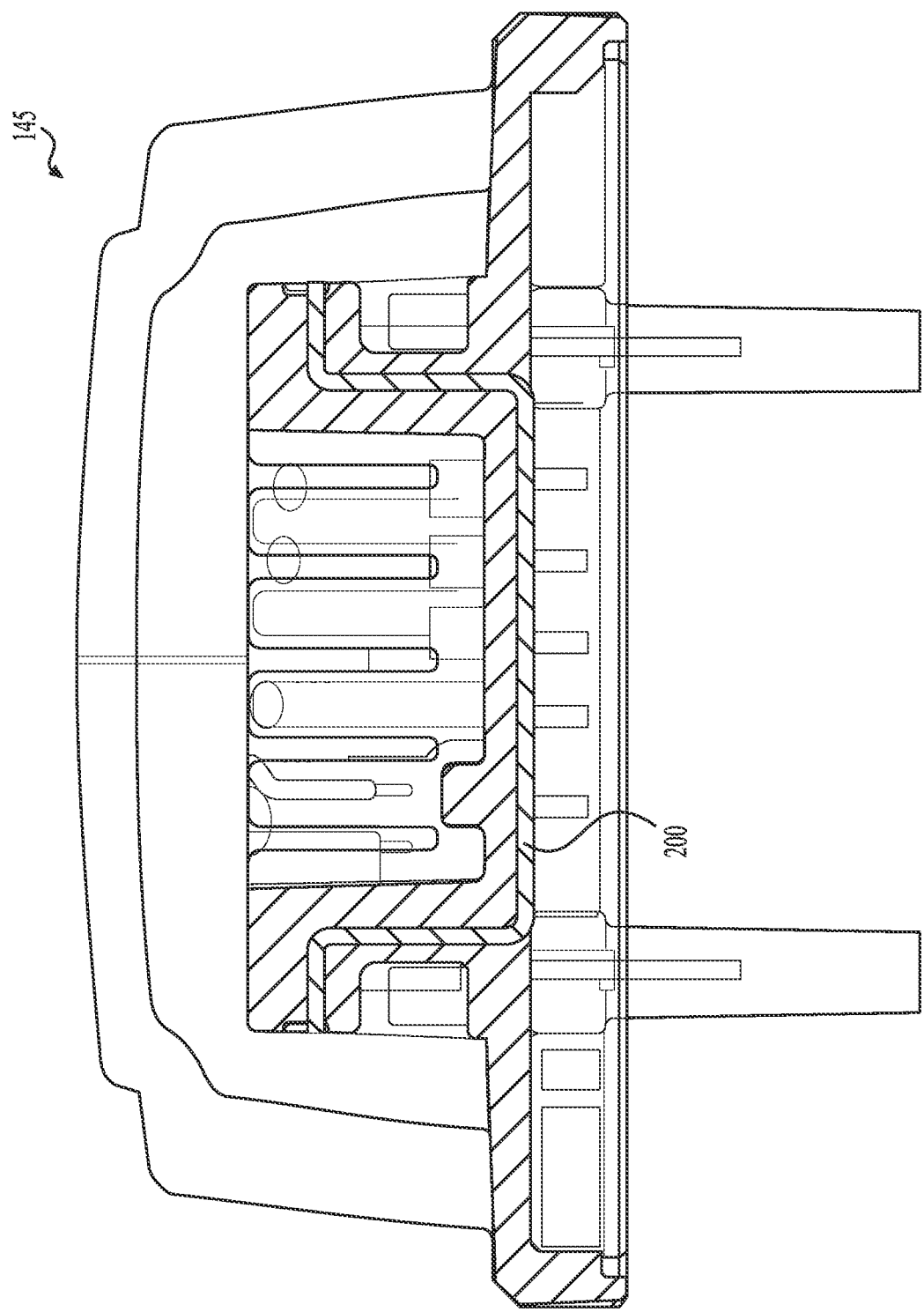
FIG. 14 is a rear section view of the top housing of the battery pack of FIG. 1 that includes the support member.

The battery cells are, for example, cylindrical 18650 battery cells (18 mm diameter and 65 mm length). Each battery cell includes a cell axis 135, a cell length, $L_C$, and a cell diameter, $D_C$, as illustrated in FIGS. 4 and 5. In other embodiments, the battery cells 110 are, for example, cylindrical 14500 battery cells (14 mm diameter and 50 mm length), 14650 battery cells (14 mm diameter and 65 mm length), 17500 battery cells (17 mm diameter and 50 mm length), 17670 battery cells (17 mm diameter and 67 mm length), 18500 battery cells (18 mm diameter and 50 mm length), 26650 battery cells (26 mm diameter and 65 mm length), 26700 battery cells (26 mm diameter and 70 mm length), etc. Each battery cell 110 can be generally cylindrical and can extend along the cell axis 135 parallel to the cylindrical outer cell wall. Also, in the battery pack 100, each battery cell 110 can have a cell length, $L_C$, which is greater than or equal to two times the cell diameter, $D_C$. In some embodiments, the battery cells are lithium-based prismatic battery cells (e.g., between 1.0 Ampere-hour ("Ah") and 10.0 Ah in battery capacity) having dimensions of, for example, approximately 50 mm to approximately 80 mm in length, approximately 60 mm to approximately 90 mm in width, and approximately 3 mm to approximately 8 mm in height. The prismatic battery cells can be implemented using, for example, a wound configuration, a wound and flattened configuration, a wound and folded configuration, or a layered and folded configuration. In the embodiment illustrated in FIG. 5, the battery pack 100 includes ten battery cells 110 that are arranged in three rows. The battery cells 110 in FIG. 5 are shown as being separated from one another for illustrative purposes. When the battery cells 110 are within the battery pack 100, the cells 110 can be positioned in closer proximity to one another.

The battery cells 110 are lithium-based battery cells having a chemistry of, for example, lithium-cobalt ("Li—Co"), lithium-manganese ("Li—Mn"), or Li—Mn spinel. In some embodiments, the battery cells 110 have other suitable lithium or lithium-based chemistries, such as a lithium-based chemistry that includes manganese, etc. The battery cells within the battery pack 100 provide operational power (e.g., voltage and current) to the power tool. In one embodiment, each battery cell 110 has a nominal voltage of approximately 3.6V, such that the battery pack has a nominal voltage of approximately 18V. In other embodiments, the battery cells have different nominal voltages, such as, for example, between 3.6V and 4.2V, and the battery pack has a different nominal voltage, such as, for example, 10.8V, 12V, 14.4V, 24V, 28V, 36V, 50V, between 10.8V and 100V, etc. The battery cells also have a capacity of, for example, approximately between 1.0 Ah and 10.0 Ah. In exemplary embodiments, the battery cells have capacities of approximately, 1.5 Ah, 2.4 Ah, 3.0 Ah, 4.0 Ah, between 1.0 Ah and 10.0 Ah, etc.

The battery cells 110 are arranged and spaced apart from one another by the battery pack 100 (e.g., each cell is provided in an individual cell receiving area 140 within the battery pack 100 that spaces each cell apart) to reduce the cell-to-cell heat transfer between the battery cells 110 and to improve the collection and removal of heat from the battery cells 110. In this manner, the battery cells 110 may be able to be maintained in an appropriate temperature operating range (e.g., below 60° C.) for longer durations of use. The battery cells 110 are also arranged to provide an efficient use of space and to maintain a relatively small pack size.

A top housing 145 of the housing 105 is illustrated in FIGS. 6-14. The top housing 145 includes a support member 200 that is made from a material different from that of the top housing 145. The support member 200 is located within the support portion 115 of the battery pack 100. The support member 200 is configured or operable to provide additional support to the battery pack 100 when it is connected to a power tool. For example, if the power tool causes vibrations or severe vibrations when in use, the forces associated with those vibrations may be sufficient to compromise the support portion 115 (e.g., when the support portion 115 is made only of plastic or another similar material). The support member 200 provides added support to the support portion 115 and reinforces the strength of the support portion 115 (e.g., the rails that are used to slide the battery pack 100 onto a power tool). In some embodiments, the support member 200 is approximately the same size as the support portion 115. In other embodiments, the support member 200 is smaller (shorter) in length than the support portion 115 or greater (longer) in length than the support portion 115 (e.g., to provide additional support to the top housing 145).

The support member 200 includes a first portion 205, a second portion 210, a third portion 215, a fourth portion 220, and a fifth portion 225. The first portion 205 is substantially flat and approximately parallel to a plane 150 of the top housing 145. In some embodiments, the support member 200 is substantially the same shape as the support portion 115. The second portion 210 and the third portion 215 are approximately perpendicular to the first portion 205 of the support member 200. In some embodiments, the second portion 210 and the third portion 215 are integrally formed with the first portion 205 or are coupled to the first portion 205. In other embodiments, the second portion 210 and the third portion 215 are separate from the first portion 205. The fourth portion 220 and the fifth portion 225 are approximately perpendicular to the second portion 210 and the third portion 215, respectively. In some embodiments, the fourth portion 220 and the fifth portion 225 are substantially parallel to the first portion 205 of the support member 200. In some embodiments, the fourth portion 220 and the fifth portion 225 are integrally formed with the second portion 210 and the third portion 215, respectively, or are coupled to the second portion 210 and the third portion 215, respectively. In other embodiments, the fourth portion 220 and the fifth portion 225 are separate from the second portion 210 and the third portion 215.

In some embodiments, the support member 200 does not include each of the first portion 205, the second portion 210, the third portion 215, the fourth portion 220, and the fifth portion 225. Rather, the support member 200 includes one or more of the first portion 205, the second portion 210, the third portion 215, the fourth portion 220, and the fifth portion 225. For example, the support member 200 can include the first portion 205, the second portion 210, and the third portion 215. In other embodiments, the support member 200 includes the second portion 210 and the third portion 215, or the support member 200 includes the fourth portion 220 and the fifth portion 225. In some embodiments, the support member 200 includes the second portion 210, the third portion 215, the fourth portion 220, and the fifth portion 225.

In the illustrated embodiments of the support member 200, the support member 200 is formed within the top housing 145 (e.g., is insert molded into the housing 105). In other embodiments, the support member 200 is affixed, attached, or fastened to a top portion of the top housing 145 and/or is affixed, attached, or fastened to a bottom portion of the top housing 145. In some embodiments, the shape of the top housing follows the shape of the support portion 115 and the rails associated with the support portion 115 for securing the battery pack 100 to a power tool. In some embodiments, the support member 200 is made of a metal or metallic material. The metal material is, for example, steel, iron, copper, aluminum, titanium, tin, zinc, nickel, cobalt, and/or an alloy of one or more metals. In some embodiments, the support member 200 includes a plurality of perforations (e.g., holes, apertures, etc.), as illustrated in FIGS. 6-14. In other embodiments, the support member 200 does not include perforations (e.g., is unperforated). In alternative embodiments, the support member 200 is made from a non-metallic material, such as a polymer, a dense plastic, carbon fiber, etc.

Figure 15:
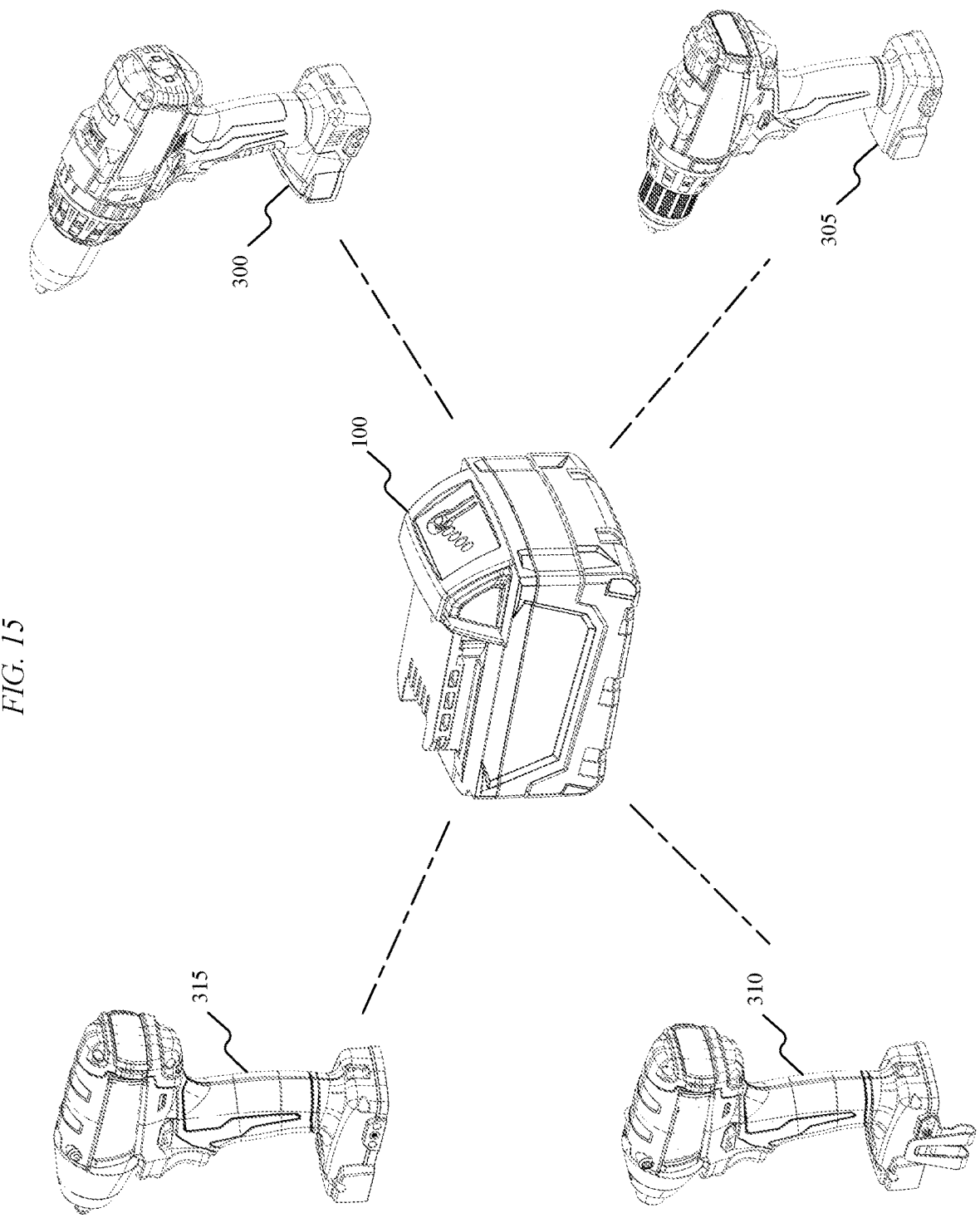
FIG. 15 illustrates the interfacability of the battery pack of FIG. 1 with various power tools.

FIG. 15 illustrates the interfacability of the battery pack 100 with various power tools. For example, the battery pack 100 can be interfaced with a hammer drill/driver 300, a drill/driver 305, an impact driver 310, an impact wrench 315, etc., via the support portion 115 and the complementary interface portions of the power tools.

Thus, the invention provides, among other things, a battery pack for a power tool that includes a top housing having a support member. Various features and advantages of the invention are set forth in the following claims.

What is claimed is:

1. A battery pack connectable to and supportable by a power tool, the battery pack comprising:
   a battery pack housing that includes a battery pack top housing, the battery pack top housing including a support portion connectable to a complementary support portion of the power tool and a support member molded within the support portion, the support member reinforcing the support portion of the battery pack top housing, the support member being made of a different material than the battery pack housing,
   wherein the support member includes a first portion, a second portion, a third portion, and a fourth portion,
   wherein the first portion is approximately parallel to the third portion,
   wherein the second portion is approximately parallel to the fourth portion,
   wherein the first portion is approximately perpendicular to and integrally formed with the second portion, and
   wherein the third portion is approximately perpendicular to and integrally formed with the fourth portion.

2. The battery pack of claim 1, wherein the support member is made of a metallic material.

3. The battery pack of claim 2, wherein the metallic material is selected from the group consisting of steel, iron, copper, aluminum, titanium, tin, zinc, nickel, and cobalt.

4. The battery pack of claim 3, further comprising a plurality of battery cells.

5. The battery pack of claim 4, wherein each of the plurality of battery cells has a length between 50 millimeters and 70 millimeters.

6. The battery pack of claim 4, wherein each of the plurality of battery cells has a battery cell nominal voltage, and the battery pack has a battery pack nominal voltage of between 10.8V and 100V.

7. The battery pack of claim 4, wherein each of the plurality of battery cells has a capacity of between 1.0 ampere-hours and 10.0 ampere-hours.

8. The battery pack of claim 1 wherein the support member is shorter in length than the support portion of the battery pack top housing.

9. The battery pack of claim 1, wherein the support member is longer in length than the support portion of the battery pack top housing.

10. The battery pack of claim 1, wherein the power tool is selected from the group consisting of a hammer drill/driver, an impact driver, and an impact wrench.

11. A battery pack connectable to and supportable by a power tool, the battery pack comprising:
   a battery pack housing that includes a battery pack top housing, the battery pack top housing including a support portion connectable to a complementary support portion of the power tool and at least one support member molded within the support portion, the at least one support member made of a metallic material, the at least one support member reinforcing the support portion of the battery pack top housing; and
   a plurality of cylindrical battery cells,
   wherein the at least one support member includes a first portion, a second portion, a third portion, and a fourth portion,
   wherein the first portion is approximately parallel to the third portion,
   wherein the second portion is approximately parallel to the fourth portion,
   wherein the first portion is approximately perpendicular to and integrally formed with the second portion, and
   wherein the third portion is approximately perpendicular to and integrally formed with the fourth portion.

12. The battery pack of claim 11, wherein the metallic material is selected from the group consisting of steel, iron, copper, aluminum, titanium, tin, zinc, nickel, cobalt, and an alloy of a plurality of metals.

13. The battery pack of claim 11, wherein electrical connections among the plurality of battery cells are selected from the group consisting of series connections, parallel connections, and a combination of series-parallel connections.

14. The battery pack of claim 13, wherein each of the plurality of battery cells has a length between 50 millimeters and 70 millimeters.

15. The battery pack of claim 14, wherein each of the plurality of battery cells has a diameter between 14 millimeters and 26 millimeters.

16. The battery pack of claim 15, wherein each of the plurality of battery cells has a battery cell nominal voltage, and the battery pack has a battery pack nominal voltage of between 10.8V and 100V.

17. The battery pack of claim 16, wherein each of the plurality of battery cells has a capacity of between 1.0 ampere-hours and 10.0 ampere-hours.

18. The battery pack of claim 17, wherein the at least one support member is shorter in length than the support portion of the battery pack top housing.

19. The battery pack of claim 11, wherein the at least one support member is longer in length than the support portion of the battery pack top housing.

20. A battery pack connectable to and supportable by a power tool, the battery pack comprising:
   a battery pack housing that includes a battery pack top housing, the battery pack top housing including a support portion connectable to a complementary support portion of the power tool and at least one support member molded within the support portion, the at least one support member made of a metallic material, the at least one support member reinforcing the support portion of the battery pack top housing,
   wherein the at least one support member includes a first portion and a second portion, and
   wherein the first portion is approximately parallel to the second portion.

* * * * *